United States Patent Office

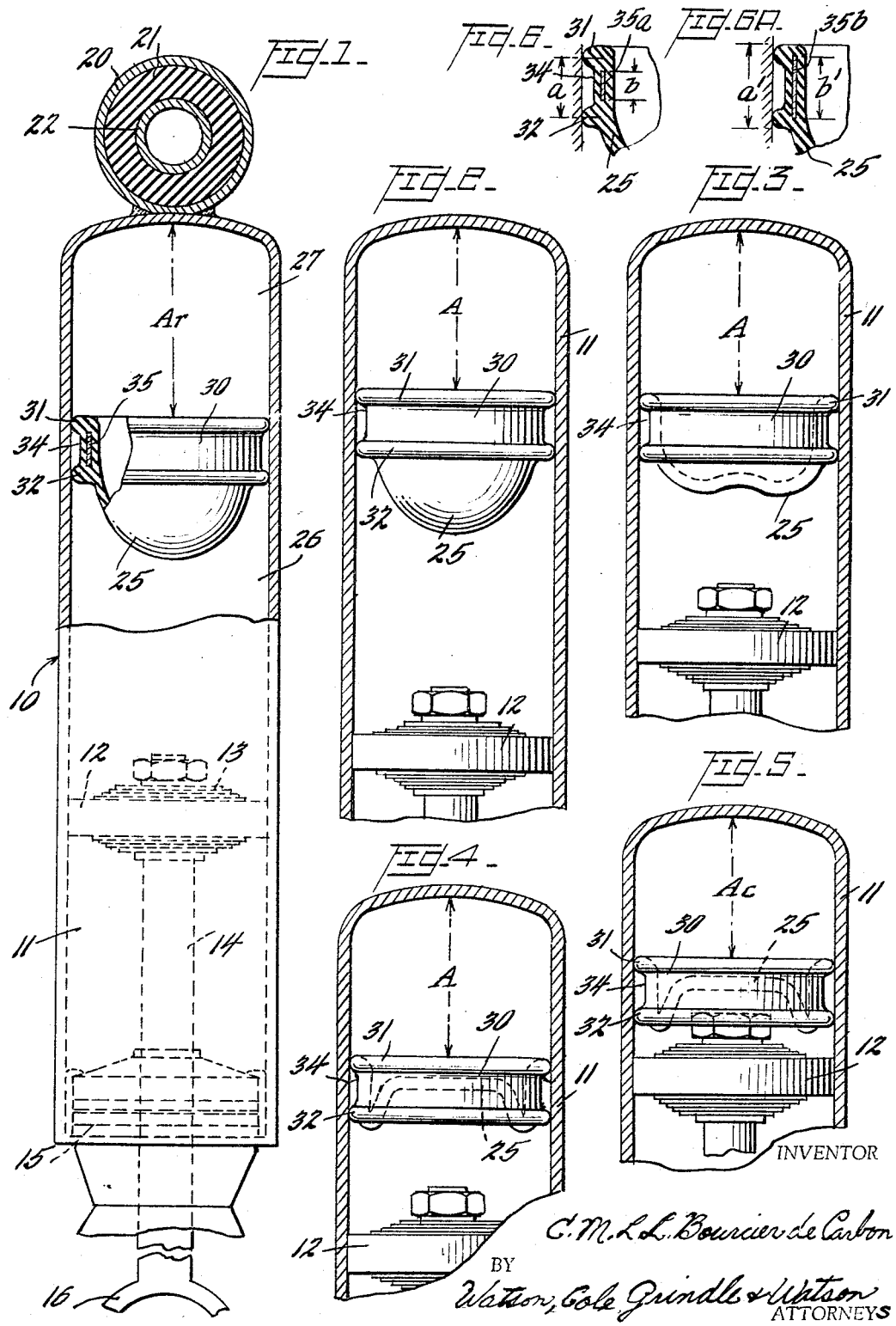

3,269,718
Patented August 30, 1966

1

3,269,718
SHOCK ABSORBERS
Christian M. L. L. Bourcier de Carbon, 64 Blvd. Maurice-
Barres, Neuilly-sur-Seine, France
Filed Aug. 26, 1964, Ser. No. 392,218
2 Claims. (Cl. 267—64)

This invention relates to shock absorbers of the direct acting pressurized hydro-pneumatic type, adapted to be connected between the chassis and the wheel mounting of a motor vehicle, and comprising a cylinder secured to one of such vehicle members and a piston reciprocable within said cylinder and fixed to a piston rod which is secured to the other of said member, the piston working in a body of damping fluid and the entrance of successive portions of said piston rod into said cylinder on the compression stroke being resisted by the provision of a body of compressible fluid in the cylinder separated from the damping fluid by means of a transversely extending yielding partition.

In United States Letters Patent No. 3,101,131, granted jointly to the present applicant and John E. Heckethorn, there is disclosed a fluid-tight floating piston slidably positioned in the cylinder and serving to separate the two bodies of fluid, and novel means were provided by that invention affording leeway for a certain amount of rolling movement on the part of the O-ring sealed within a groove provided in the outer periphery of the floating piston, whereby upon smooth boulevard travel the working piston would have such a minimum stroke that the displacement of damping fluid would also be slight and the consequent movement of the floating piston and compression of the pressure fluid would also be at a minimum. Such oscillation of the floating piston would cause only rolling movement of the O-ring within its groove. However, further displacement (say beyond about one inch of travel), as when the wheels of the vehicle strike an obstacle, or upon travel on generally rough roads, would cause the O-ring to abut one or the other of the walls of its groove and then be forced to slide along the inner wall of the cylinder during the remainder of the oscillation in either direction.

Now, for certain uses, it has been proposed to employ a flexible diaphragm—usually of a somewhat expansible and contractible balloon-like construction—for separating the two bodies of fluid; the margins of the diaphragm being in fixed sealing relationship to the cylinder wall. One example of such an installation is disclosed in my United States application Serial No. 166,145, filed January 15, 1962. However, to provide such a bulged diaphragm the volumetric displacement of which for all conditions of vibration is obtained by flexing alone, would not be feasible, especially in certain types and sizes of shock absorbers. If such fixed diaphragms were not capable of such extreme expansion or flexing, there would be danger of bursting or of fatiguing and cracking of the material of which the diaphragm is made, and it would deteriorate rapidly.

Therefore one of the principal objects of the present invention is the provision of a novel and improved shock absorber of the class described, in which a flexible diaphragm is provided at the common boundary of the working fluid and the compressed pressurizing fluid which, while sealed airtight against the walls of the cylinder, is capable of sliding movement with relation to said cylinder walls under increased stress.

The actual flexibility of the bulged or ballooned diaphragm is, of course, sufficient to take care of normal piston rod displacement while driving over relatively smooth roads. When an occasional chuck hole or dip is encountered the diaphragm flexes to its maximum and becomes taut. Further movement of the piston rod causes the diaphragm installation to slide along the cylinder wall until the rod comes to a halt and reverses its direction of movement.

The diaphragm is provided with a rather stiff collar or supporting ring and this ring must bear against the inner walls of the cylinder with sufficient friction to prevent continual sliding, and yet the friction must not be so great as to overstress the diaphragm itself during larger road movements. It is preferred that the sliding of the diaphragm collar or ring along the cylinder wall should not take place until approximately a minimum of one inch of road movement has taken place.

Other objects and features of novelty will be apparent from the following specification when read in connection with the accompanying drawings in which one embodiment of the invention is illustrated by way of example.

In the drawings:

FIGURE 1 is a view in elevation of a shock absorber embodying the principles of the invention, the upper portion of the cylinder thereof and a fragment of the diaphragm unit being shown in vertical section, the diaphragm unit being in a downwardly displaced position as under a considerable rebound action by the piston;

FIGURE 2 is a similar view of the upward portions of the shock absorber showing the diaphragm unit in a normal position of operation, with the diaphragm itself in a relaxed condition and the piston near the bottom of a short stroke;

FIGURE 3 is a similar view showing the piston in an intermediate position along its short stroke;

FIGURE 4 is a similar view showing the piston at the upper end of a normal short stroke;

FIGURE 5 is a similar view showing the piston in an extreme position beyond what would be considered a normal short compression stroke, and the diaphragm unit displaced bodily upwardly by sliding along the walls of the cylinder; and FIGURES 6 and 6A are fragmentary sectional views illustrating the manner of predetermining the frictional contact between the diaphragm collar or ring and the wall of the cylinder, by varying the extent of the stiff reinforcing ring of the collar.

For purposes of example, the shock absorber has been illustrated somewhat diagrammatically at 10 as of the reciprocating cylinder piston type of pressurized shock absorber, the cylinder 11 of which receives the piston 12 for reciprocating movement. The piston is provided with the usual valving 13 and is rigid with a piston rod 14 which extends through a packed lower end 15 of the cylinder to be connected to the wheel mounting as by means of the eye 16.

Similarly, the upper end of the cylinder 11 is provided with a resilient ring or grommet 21 which encircles means 22 connected with the chassis of the vehicle.

Within the cylinder 11 is positioned a bulbous balloon-like flexible diaphragm 25 which provides a boundary partition between the body of damping liquid occupying the working chamber 26 of the cylinder and the body of compressed gaseous fluid occupying the portion 27 of the interior of the cylinder above the partition 25.

The partition member 25 may be made of any suitable flexible material but is preferably composed of an elastomer which will remain flexible and resist cracking from minus 40° F. to plus 212° F. The compound of which the partition or diaphragm is made must resist swelling from contact with the damping fluid and also to withstand continual flexing. It must also resist transfer of nitrogen gas which may comprise the compressible gas occupying the portion 27 of the cylinder. It is suggested that a neoprene or nitrile compound would appear to be the best for these requirements.

The diaphragm 25 is provided with a semi-rigid ring or neck portion 30 molded to provide two spaced annular flanges or "pads" 31 and 32 which project outwardly into contact with the inner walls of the cylinder 11. The lower flange 32 merges into the bulbous body of the diaphragm 25 and the two flanges 31 and 32 are connected by the intermediate annular approximately cylindrical portion 34. Within this connecting portion of the neck is embedded a rigid, optionally metallic, reinforcing annulus or sleeve 35.

Now, it is necessary that the friction between the contact pads or flanges 31 and 32 and the wall of the cylinder be so governed and calibrated that the friction will prevent continual sliding movement of the diaphragm along the cylinder wall, and yet the friction must not be so great as to overstress the diaphragm during the greater piston rod movements. Thus the friction against the internal diameter of the cylinder and the strength of the diaphragm section must be very well balanced or rupturing of the diaphragm might occur. On the other hand, if the diaphragm is too stiff and the wall friction too low the unit could race up and down the cylinder without flexing.

Therefore, in order to provide sufficient friction against the cylinder wall so as to promote flexing of the diaphragm and also sufficient strength in the diaphragm neck to resist rupturing during the periods of re-positioning of the diaphragm along the cylinder wall, ingenious means for predetermining the friction bearing pressure of the diaphragm neck against the wall have been provided. This provision is exemplified in FIGURES 1, 6 and 6A of the drawings. In FIGURE 1 the reinforcing ring or annulus 35 is of a vertical height with relation to the spacing of the contact pads or flanges 31 and 32, but will give a mean resistance to the ring and provide an average frictional bearing against the wall of the cylinder. In FIGURE 6 the width of the reinforcing ring 35a is somewhat smaller as indicated by the dimension $b$ as compared with the spacing $a$ of the bearing pads. This will give a considerably reduced friction of the neck of the diaphragm against the cylinder wall and is applicable to certain conditions of the vehicle wheel mounting especially in cases where exceptional volume variations, that is very great movements of the piston, and thermal variations of the volume of oil, and will avoid sticking or adhering of the diaphragm upon the walls of the cylinder as can result from the application of too high pressure. On the other hand, in cases where increased friction and increased rigidity on the neck of the diaphragm the reinforcing ring will be of a greater height, for example $b'$ as applied to the ring 35b in FIGURE 6A.

Now with respect to the actual operation and shifting of the diaphragm unit, reference is first made to FIGURES 2, 3 and 4 of the drawings where the diaphragm 25 and its neck or ring portion 30 occupy a mean intermediate position with respect to the cylinder, where the distance from the head of the cylinder to the upper rim of the neck of the diaphragm is represented by A.

The condition of the diaphragm 25 in FIGURE 2 is that of the absence of any appreciable compression or rebound movement of the working piston 12, and the bulbous portion of the diaphragm is in relaxed fully rounded condition.

Now upon a slight compression movement of the piston 12 as during minor variations expressed in boulevard travel, the flexible bulbous portion of the diaphragm 25 will collapse to an intermediate condition illustrated in FIGURE 3 of the drawings.

In FIGURE 4 is represented the approximately fully collapsed condition of the flexible diaphragm at the maximum of the slight compressive movement of the working piston 12, within the scope of boulevard action.

In all of the positions as shown in FIGURES 2, 3 and 4 during slight piston movements, the neck or ring 30 has has not moved along the wall of the cylinder 11, but the bulbous portion of the diaphragm will flex or pulsate between the positions in FIGURE 2 and FIGURE 4 under the gentle movements during travel on relatively smooth surfaces.

However, upon encountering the obstruction which will increase the compression movement of the piston 12, the condition will arise as illustrated in FIGURE 5 of the drawings, where not only is the bulbous portion of the diaphragm compressed to its maximum as in FIGURE 4, but the diaphragm as a whole has moved upwardly along the walls of the cylinder 11 to the point where its distance from the head of the cylinder, represented at $A_c$ is appreciably less than the minimum distance A as in FIGURES 2, 3 and 4.

Similarly, upon increased rebound movement of the working piston 12, as for example upon recovery after the excessive compression illustrated in FIGURE 5, or upon the wheels falling into a chuck hole, the piston will move downwardly as suggested in FIGURE 1 of the drawings whereupon the diaphragm 25 will be drawn downwardly along the walls of the cylinder 11 so that it is spaced from the head of the cylinder the distance $A_r$ which is, of course, greater than the mean distance A.

Thus, it will be seen that if the friction of the neck of the diaphragm against the cylinder wall was too great taking into consideration all of the factors of the motor vehicle and the general construction of the shock absorber, the extra compression force of the piston, as in FIGURE 5, might burst the diaphragm in one direction; or the extra force of the piston during a rebound stroke might burst or fracture the diaphragm 25 in a downward direction.

Of course, the actual bodily movement of the diaphragm assembly depends upon the ratio of the internal diameter of the cylinder to the external diameter of the piston rod, and the movement of the diaphragm has the same ratio with respect to the movement of the working piston. Thus in a shock absorber where the cylinder to piston rod ratio is 10.5:1, an additional three-fourths inch of piston travel will cause the diaphragm to move approximately 0.071 inch.

It is understood that various changes and modifications may be made in the embodiment illustrated and described herein without departing from the scope of the invention as determined by the subjoined claims.

Having thus described the invention, what is claimed as new and desired to be secured by Letters Patent is:

1. A direct-acting piston-and-cylinder hydro-pneumatic shock absorber for damping the relative compression and rebound movements between two members, namely, the body and the wheel suspension of a motor vehicle, said shock absorber comprising, in combination, a cylinder adapted to be connected with one of said members and containing a body of damping liquid, a piston reciprocable within the body of damping fluid in the cylinder, a piston rod rigidly connected with said piston and extending through a packed opening in one end of said cylinder and adapted to be connected with the other of said members; the opposite end portion of said cylinder being closed and containing a body of compressed gaseous fluid, a floating flexible diaphragm member extending transversely across the interior of said cylinder and constituting the boundary between said body of damping liquid and said body of gaseous fluid, the peripheral margin of said diaphragm member being sufficiently rigid to be self-sustaining and disposed in sliding air-tight and liquid-tight sealing contact with the inner wall of said cylinder, and a central portion of said diaphragm member being flexible to yield in either direction upon variations in displacement of damping liquid by entry and departure of portions of the piston rod under limited movements of the piston as in the case of smooth boulevard riding, the diaphragm member being capable of sliding bodily along said cylinder wall upon the occurrence of greater movements of said piston and means provided for ensuring a sufficient degree of rigidity of said marginal portion so that the periphery of the diaphragm member possesses sufficient frictional resistance to movement along the cylinder wall to give rise to flexing of the diaphragm member without bodily movement of the diaphragm member during such limited movement of the piston, and in which said central portion of the diaphragm member has sufficient strength to resist rupture during periods of bodily movement thereof when subjected to increased piston movements.

2. The shock absorber as set forth in claim 1 in which the flexible central portion of the diaphragm member is of a bulbous configuration and the neck portion thereof is composed of a somewhat deformable resilient material and is formed with two axially spaced annular ridges having actual contact with the cylinder wall, and the peripheral portion between said ridges being spaced slightly away from said cylinder wall, and in which said peripheral neck portion has a relatively rigid sleeve embedded therein and bridging the space between the ridges to apply a predetermined stiffness to the neck structure to govern the bearing friction against the cylinder wall, the extent of the axial dimension of the sleeve predetermining the degree of friction between the ridges and the cylinder wall.

References Cited by the Examiner

UNITED STATES PATENTS 2,492,014  12/1949  Spalding et al. _____ 138—30 X
3,140,085   7/1964  De Carbon _____ 188—100

FOREIGN PATENTS 1,260,562   9/1961  France.

ARTHUR L. LA POINT, *Primary Examiner.*

H. R. FIELD, R. M. WOHLFARTH,
*Assistant Examiners.*